(12) United States Patent
Iwashita et al.

(10) Patent No.: US 6,749,703 B2
(45) Date of Patent: Jun. 15, 2004

(54) ULTRASONIC WELDING METHOD AND APPARATUS FOR WELDING REINFORCING TAPE PIECE TO FASTENER TAPE

(75) Inventors: Keisuke Iwashita, Toyama (JP); Hideji Maeda, Toyama (JP); Satoshi Matsumura, Toyama (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/299,701

(22) Filed: Nov. 20, 2002

(65) Prior Publication Data

US 2003/0121589 A1 Jul. 3, 2003

(30) Foreign Application Priority Data

Dec. 28, 2001 (JP) .................................. P. 2001-400321

(51) Int. Cl.[7] .............................................. B29C 65/08
(52) U.S. Cl. ...................... 156/64; 156/73.1; 156/350; 156/580.1; 156/580.2
(58) Field of Search ...................... 156/64, 73.1, 308.2, 156/309.6, 350, 351, 358, 359, 580.1, 580.2

(56) References Cited

U.S. PATENT DOCUMENTS

| | | |
|---|---|---|
| 4,453,990 A | 6/1984 | Takahashi |
| 5,795,419 A * | 8/1998 | Lotz et al. .................... 156/64 |
| 5,855,706 A * | 1/1999 | Grewell ....................... 156/64 |
| 6,036,796 A * | 3/2000 | Halbert et al. ................ 156/64 |
| 6,458,228 B1 * | 10/2002 | Yoshimoto .................... 156/64 |

FOREIGN PATENT DOCUMENTS

| | | |
|---|---|---|
| JP | 62-140823 | 6/1987 |
| JP | 62-54001 | 11/1987 |
| JP | 63-40085 | 8/1988 |
| JP | 63-315223 | 12/1988 |
| JP | 2-35661 | 8/1990 |
| JP | 5-299480 | 11/1993 |
| JP | 2001-179837 | 7/2001 |

* cited by examiner

*Primary Examiner*—James Sells
(74) *Attorney, Agent, or Firm*—Finnegan, Henderson, Farabow, Garrett & Dunner, L.L.P.

(57) ABSTRACT

In order to weld a reinforcing tape piece formed of a synthetic resin to a separable bottom stop attachment portion of a slide fastener chain by ultrasonic heating over a core portion and a main tape portion in a fastener tape, a welding time and/or an amplitude which are/is suitable for welding the reinforcing tape piece to the core portion and the vicinity of the core portion, and a welding time and/or an amplitude which are/is suitable for welding the reinforcing tape piece to the main tape portion are preset respectively. The welding of the reinforcing tape piece to the core portion and the vicinity of the core portion and the welding of the reinforcing tape piece to the main tape portion are carried out in two stages in accordance with the welding time or the amplitude which is set.

15 Claims, 5 Drawing Sheets

ULTRASONIC WELDING METHOD AND APPARATUS FOR WELDING REINFORCING TAPE PIECE TO FASTENER TAPE

BACKGROUND OF THE INVENTION

1. Field of the Invention

The present invention relates to a method and apparatus for welding a reinforcing tape formed of a synthetic resin to a portion to which the separable bottom stop of a slide fastener chain is to be attached over the core portion of a fastener tape and a main tape portion by ultrasonic heating.

2. Description of the Related Art

A space portion (a tool lacking portion) for attaching an upper stopper and a separable bottom stop is intermittently formed in a fastener chain for a slide fastener having the separable bottom stop. The separable bottom stop is attached to the space portion. Before the separable bottom stop is attached, a reinforcing tape piece formed of a synthetic resin is usually bonded to the separable bottom stop attachment portion of the fastener chain, thereby giving a reinforcement.

The reinforcing tape piece is bonded in such a configuration as to hold opposed tape side edges in the space portion of the fastener chain, and a core cord is woven into each of the opposed side edges of the fastener chain and they are therefore thick. When the whole reinforcing tape piece is simultaneously bonded to a thick portion and a flat portion by pressure, wrinkles and air bubbles to cause a separation remain. Furthermore, the bonding configuration of the reinforcing tape piece is apt to be broken. In order to solve the problem, the reinforcing tape piece is bonded and integrated in two stages as described in JP-B-62-54001 and JP-B-63-40085, for example.

In JP-B-62-54001, for example, a reinforcing tape piece is provided orthogonally to the space portion of a fastener chain for each transfer stop period of each fastener chain, the upper and lower edges of the reinforcing tape piece are bent and the reinforcing piece is held from the inside and outside of the space portion. A core cord portion held by the reinforcing tape piece and a tape portion in the vicinity thereof are then pressurized and heated from the inside and outside to bond a part of the reinforcing tape piece to the core cord portion, and subsequently, the reinforcing tape piece provided adjacently to the bonding region and the non-bonding region of the tape portion are pressurized and heated from the inside and outside to completely bond and integrate both of them.

In JP-B-63-40085, moreover, a reinforcing tape piece having a constant dimension which is formed of a thermoplastic synthetic resin is caused to abut across the opposed edges of left and right fastener tapes from both upper and lower sides of a reinforcing tape attachment portion in the space portion of a slide fastener chain. The reinforcing tape piece is interposed by pressure between an ultrasonic horn and an anvil. The ultrasonic horn includes a straight concave groove in a portion corresponding to the core cords of the left and right fastener tapes and a cutting blade on the outer end of the core cord. The anvil includes a straight concave groove in a portion corresponding to the core cord and a cutting blade on the outer end of the core cord in the same manner. Then, an ultrasonic processing is carried out and the reinforcing tape piece is welded to the outer periphery of the core cords of the left and right fastener tapes and a tape portion in the vicinity thereof, and at the same time, the reinforcing tape piece provided between the opposed core cords is cut out and the residual portion of the reinforcing tape piece is then welded to the both faces of each of the left and right fastener tapes by pressurization and heating.

On the other hand, for example, JP-B-2-35661 and JP-A-63-315223 have disclosed the control method for welding, which utilizes an ultrasonic vibration in which the temperature of a horn is detected to control the amplitude of the ultrasonic vibration of the horn. In the control method, control is carried out such that a temperature detecting element, for example, a thermistor is attached to a presser tool or a receiving portion to detect a temperature, and the amplitude of the ultrasonic vibration is increased if the temperature is low and the amplitude is reduced if the temperature is high. Moreover, as disclosed in JP-A-62-140823 and JP-A-5-299480, for example, the temperature of an ultrasonic horn including a heating device such as a heater is detected and the heating device is controlled to maintain the temperature of the horn to be constant.

According to each of the bonding (welding) techniques for the reinforcing tape piece disclosed in JP-B-62-54001 and JP-B-63-40085, the core cord portion of a fastener tape and a tape portion in the vicinity thereof are welded to be held by a reinforcing tape piece in a first stage and the residual non-welding region of the reinforcing tape piece is welded to the fastener tape in a second stage so that integration is carried out in two stages. In JP-B-62-54001, development has been carried out on the assumption that the reinforcing tape piece is bonded to the space portion of the fastener chain through an adhesive in the two stages, and the bonding (welding) can be carried out by heating and welding using a heater if a thermoplastic synthetic resin material is used for the reinforcing tape piece. On the other hand, in JP-B-63-40085, ultrasonic welding means is employed in a first stage and heating and welding means using an ordinary heater is employed in a second stage.

As described above, it is necessary to strictly control a heating temperature and a processing time for the welding using the heater. If either of them is lessened, a bonding failure is caused. If either of them is excessive, the reinforcing tape piece enters the fastener tape in a fusing state. Consequently, the fastener tape is caused to be fragile and excessively rigid so that it might be bent or damaged easily. In addition, the welding using heater heating takes a longer time for the processing as compared with general ultrasonic welding. As disclosed in JP-B-63-40085, for example, in the case in which a welding step using the heater heating is to be carried out after the ultrasonic welding, a difference is made on the processing time. If the heating temperature of the heater is increased to match the difference in the processing time with an ultrasonic welding time in order to prevent a separation from being caused by a bonding failure, excessive heating is generally apt to be caused so that a welding portion becomes rigid and fragile. In the case in which the heating is carried out by the heater, furthermore, an air bubble is easily generated between a core cord portion and a main tape portion.

On the other hand, in the case in which a reinforcing tape piece is to be bonded to the space portion of a fastener tape of this kind, the holding configuration of the reinforcing tape piece is to be usually arranged uniformly by molding as well as welding in order to decide the configuration of the core cord portion. On the other hand, it is sufficient that the bonding of the reinforcing tape piece to the main tape portion of the fastener tape is simply carried out without changing a surface configuration thereof as long as a bonding strength is maintained. In the welding to be carried out by the ultrasonic heating under the proper conditions, only a welded surface is fused and bonded by internal heating. Consequently, a processed surface is finished finely without a deformation.

If the core cord portion of the fastener tape and the main tape portion are to be welded at the same time by using a single ultrasonic horn and a single anvil as disclosed in JP-A-5-299480, an ultrasonic oscillation is carried out with the same amplitude in an equal time for the core cord portion of the fastener tape and the main tape portion during the welding. On the other hand, it is desirable that the pressing force of the molded surfaces of the ultrasonic horn and the anvil for the core cord portion of the fastener tape at time of the ultrasonic vibration should be smaller than the pressing force of the molded surfaces of the ultrasonic horn and the anvil for the main tape portion of the fastener tape because the pressing and molding is carried out at the same time as described above.

However, conventionally, the pressed surfaces of the ultrasonic horn and the anvil are set to be lightly held with respect to the fastener tape and are set to be strongly pressed in order to obtain a predetermined sectional configuration with respect to the core cord portion. When the ultrasonic welding is carried out with the same amplitude in an equal time with such a configuration of the pressed surface, an excessive energy is given to the core cord portion having the great pressing force. As a result, the reinforcing tape piece portion of the core cord portion is greatly fused so that the core cord portion becomes rigid and fragile in many cases.

SUMMARY OF THE INVENTION

The invention has been made to solve the conventional problems and has an object to provide a welding method in which a core cord portion and a main tape portion are welded by ultrasonic heating under proper conditions respectively in order to weld a reinforcing tape piece to the space portion of a fastener chain and a welding apparatus therefor.

The object can be attained effectively by an ultrasonic welding method for welding a reinforcing tape to a fastener tape having a main structure according to a first aspect of the invention.

The structure is characterized by a method for welding a reinforcing tape piece formed of a synthetic resin to a separable bottom stop attachment portion of a slide fastener chain by ultrasonic heating over a core portion and a main tape portion in a fastener tape, including the steps of setting a welding time and/or an amplitude which are/is suitable for welding the reinforcing tape piece to the core portion and the vicinity of the core portion, and a welding time and/or an amplitude which are/is suitable for welding the reinforcing tape piece to the main tape portion, and welding the reinforcing tape piece to the core portion and the vicinity of the core portion and welding the reinforcing tape piece to the main tape portion based on the welding time or the amplitude which is set.

As fifth and ninth aspects, moreover, the invention related to a suitable welding apparatus for carrying out the invention related to the method is characterized by an ultrasonic horn and an anvil having outer configurations of the core portion and the main tape portion in the fastener tape in the separable bottom stop attachment portion of the slide fastener chain, and a control portion connected to an ultrasonic vibrator connected to the ultrasonic horn and having a time and/or amplitude setting portion capable of setting a suitable welding time and/or amplitude for welding the reinforcing tape piece to the core portion and the vicinity of the core portion and a suitable welding time and/or amplitude for welding the reinforcing tape piece to the main tape portion respectively. In the invention, accordingly, the expected object can be attained by only setting one of the welding time and the amplitude, and both the welding time and the amplitude can also be set at the same time.

With such a structure, the reinforcing tape piece and the core portion and the main tape portion in the fastener tape in the separable bottom stop attachment portion of the slide fastener chain are subjected to the ultrasonic welding under proper conditions respectively. Therefore, the core portion can be prevented from being fragile and rigid and the main tape portion can be prevented from being welded insufficiently, and furthermore, the reinforcing tape piece can be prevented from separating from the main tape portion during the use of the slide fastener. Moreover, the ultrasonic welding is carried out under the proper conditions. Therefore, an air bubble generated on the welded surface is efficiently removed out by an ultrasonic vibration. Consequently, the air bubble can be prevented from remaining on the welded surface so that finishing can be carried out with a high transparency.

As a second aspect of the invention, it is preferable that the welding time or amplitude which is suitable for welding the reinforcing tape piece to the core portion and the vicinity of the core portion should be set to be smaller than the welding time or amplitude which is suitable for welding the reinforcing tape piece to the main tape portion. Whether the ultrasonic welding is carried out properly depends on the welding time, the pressing force and the amplitude. As described above, the core portion is to be molded to have a desirable section simultaneously with the welding of the reinforcing tape piece. Therefore, the pressing force to be applied to the core portion is greater than the pressing force to be applied to the main tape portion. For example, in the case in which the welding times for the core portion and the main tape portion are set to be equal to each other, the amplitude of the core portion is set to be smaller corresponding to the greater pressing force. In the case in which the amplitudes are set to be equal to each other, moreover, the welding time of the core portion is set to be shorter than the welding time of the main tape portion.

Third and fourth aspects of the invention are directed to the welding method wherein the welding of the reinforcing tape piece to the core portion and the main tape portion in the vicinity of the core portion and the welding of the reinforcing tape piece to the main tape portion are carried out independently and separately or the reinforcing tape piece is welded to the main tape portion and the main tape portion and the reinforcing tape piece are successively welded to the core portion and the main tape portion in the vicinity of the core portion at the same time.

Accordingly, as a sixth aspect of the invention, for example, the ultrasonic horn is formed by a single horn and the anvil is provided with a first anvil for supporting a pair of core portions and a pair of main tape portions in the vicinity of the core portions in the slide fastener chain and a pair of second anvils for supporting the main tape portions to be operable independently each other.

In this case, as a seventh aspect of the invention, for example, it is desirable that the control portion should further include a sequence control portion for moving the second anvil to a welding position to hold the reinforcing tape piece and the main tape portion together with the ultrasonic horn and for operating the ultrasonic vibrator for the set time to heat and weld the reinforcing tape piece and to then move the second anvil to a standby position and for moving the first anvil to a welding position to hold the reinforcing tape piece, the pair of core portions and the main tape portions in the vicinity of the core portions together with the ultrasonic horn and for operating the ultrasonic vibrator for the set time to heat and weld the reinforcing tape piece and to then move the second anvil to the standby position.

As an eighth aspect of the invention, for example, the control portion can further include a sequence control portion for moving the second anvil to a welding position to hold the reinforcing tape piece and the main tape portion together with the ultrasonic horn and for operating the ultrasonic vibrator for the set time to move the first anvil to the welding position in the middle of heating and welding for the reinforcing tape piece and to hold the reinforcing tape piece, the pair of core portions and the main tape portions in the vicinity of the core portions together with the ultrasonic horn, thereby heating and welding the reinforcing tape piece in a residual operating time together with the main tape portion and then moving the first and second anvils to the standby position.

More specifically, according to the seventh aspect of the invention, the welding of the reinforcing tape piece to the main tape portion and the welding of the reinforcing tape piece to the core portion and the main tape portion in the vicinity of the core portion are carried out separately in accordance with each set time. According to the eighth aspect of the invention, the welding of the reinforcing tape piece to the main tape portion and the welding of the reinforcing tape piece to the core portion and the main tape portion in the vicinity of the core portion are carried out continuously by utilizing a difference between the set times.

In the case in which the control portion includes the amplitude setting portion, as a tenth aspect of the invention, the ultrasonic horn is formed by a single horn and the anvil is provided with a first anvil for supporting a pair of core portions and a pair of main tape portions in the vicinity of the core portions in the slide fastener chain and a pair of second anvils for supporting the main tape portions to be operable independently each other. The control portion further includes an operation indicating portion for operating an ultrasonic horn with the corresponding set amplitude when holding the reinforcing tape piece, the pair of core portions and the main tape portions in the vicinity of the core portions by the ultrasonic horn and the first anvil, and for operating the ultrasonic horn with the corresponding set amplitude when holding the reinforcing tape piece and the main tape portion between the ultrasonic horn and the second anvil. In this case, the single horn is operated with a change into each preset amplitude and the first or second anvil is operated to the welding position corresponding to the operating amplitude of the horn, thereby sequentially carrying out the welding of the reinforcing tape piece to the main tape portion and the welding of the reinforcing tape piece to the core portion and the main tape portion in the vicinity of the core portion.

As an eleventh aspect of the invention, moreover, the ultrasonic horn includes a first horn for exciting the core portions and the main tape portions in the vicinity of the core portions in the slide fastener chain and a second horn for exciting the main tape portion. The anvil is provided with a first anvil opposite to the first horn and a second anvil opposite to the second horn to be operable independently each other, and the control portion further includes an operation indicating portion for operating an ultrasonic horn with the corresponding set amplitude when holding the reinforcing tape piece, the pair of core portions and the main tape portions in the vicinity of the core portions by the first horn and the first anvil, and for operating the second horn with the corresponding set amplitude when holding the reinforcing tape piece and the main tape portion between the second horn and the second anvil.

More specifically, according to a tenth aspect of the invention, the single horn is operated in accordance with the two preset amplitudes and the first or second anvil is moved according to each set amplitude, and the welding of the reinforcing tape piece to the main tape portion and the welding of the reinforcing piece to the core portion and the main tape portion in the vicinity of the core portion are carried out separately in accordance with each set time. According to a eleventh aspect of the invention, the reinforcing tape piece, the core portion and the main tape portion in the vicinity of the core portion are welded to each other with the set amplitude between the first horn and the first anvil which are operated with the set amplitude, and the reinforcing tape piece and the main tape portion are welded to each other between the second horn and the second anvil which are operated with different set amplitudes.

DETAILED DESCRIPTION OF THE PREFERRED EMBODIMENTS

A typical embodiment of the invention will be specifically described below with reference to the drawings.

Figure 1:
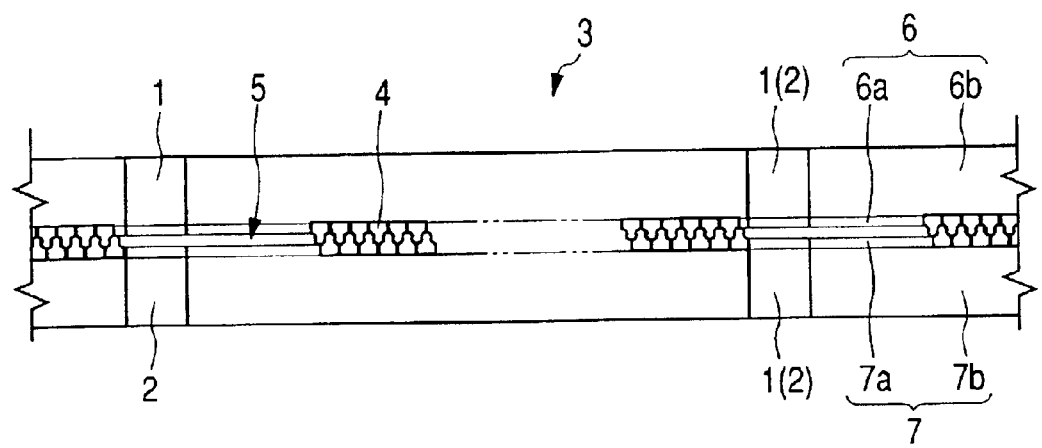
FIG. 1 is a plan view showing a slide fastener chain having a reinforcing tape welded by an ultrasonic welding apparatus according to the invention.

FIG. 1 shows a slide fastener chain 3 to which reinforcing tape pieces 1 and 2 are bonded by a welding method according to the invention. A space portion 5 from which a tooth 4 is removed is formed in a unit of a slide fastener in the direction of the length of the slide fastener chain 3 as shown in FIG. 1. The reinforcing tape pieces 1 and 2 enclose the periphery of core portions 6a and 7a formed along the opposed tape side edges of fastener tapes 6 and 7 exposed to the space portion 5, and the reinforcing tape pieces 1 and 2 are welded and integrated over the whole surface and back face of each of main tape portions 6b and 7b.

Figure 2:
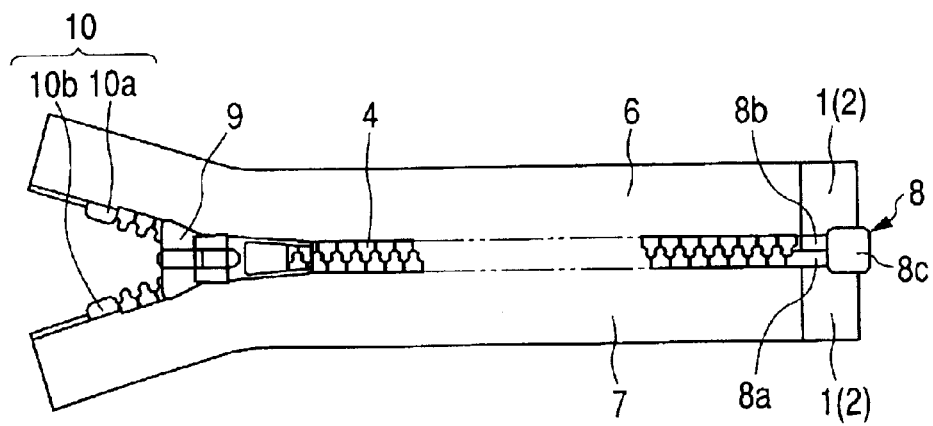
FIG. 2 is a plan view showing a slide fastener obtained from the slide fastener chain.

In the embodiment, the reinforcing tape pieces 1 and 2 have a lamination structure in which a synthetic resin layer having a comparatively low melting point is provided or coated on the welded surface side of a woven tape or a synthetic resin film tape which is formed of the same material as the materials to be used for the fastener tapes 6 and 7. The welding regions of the reinforcing tape pieces 1 and 2 are portions to which a separable bottom stop 8 is to be attached later as shown in FIG. 2. In the case in which the reinforcing tape pieces 1 and 2 have non-uniform sectional configurations obtained by welding to the core portions 6a and 7a or the reinforcing tape pieces 1 and 2 are not welded accurately orthogonally to the direction of the length of the fastener tape, it is impossible to attach the separable bottom stop 8 strongly and accurately.

When the reinforcing tape pieces 1 and 2 are welded to the fastener chain 3, an insert pin 8a and a box pin 8b in the separable bottom stop 8 are first attached to the welding regions of the reinforcing tape pieces 1 and 2 by molding or crimping and a slider 9 is then inserted, and a box member 8c of the separable bottom stop 8 and an upper stopper 10 (10a, 10b) are attached and cutting is thereafter carried out in a space portion. Consequently, a slide fastener shown in FIG. 2 is fabricated.

Figure 3:
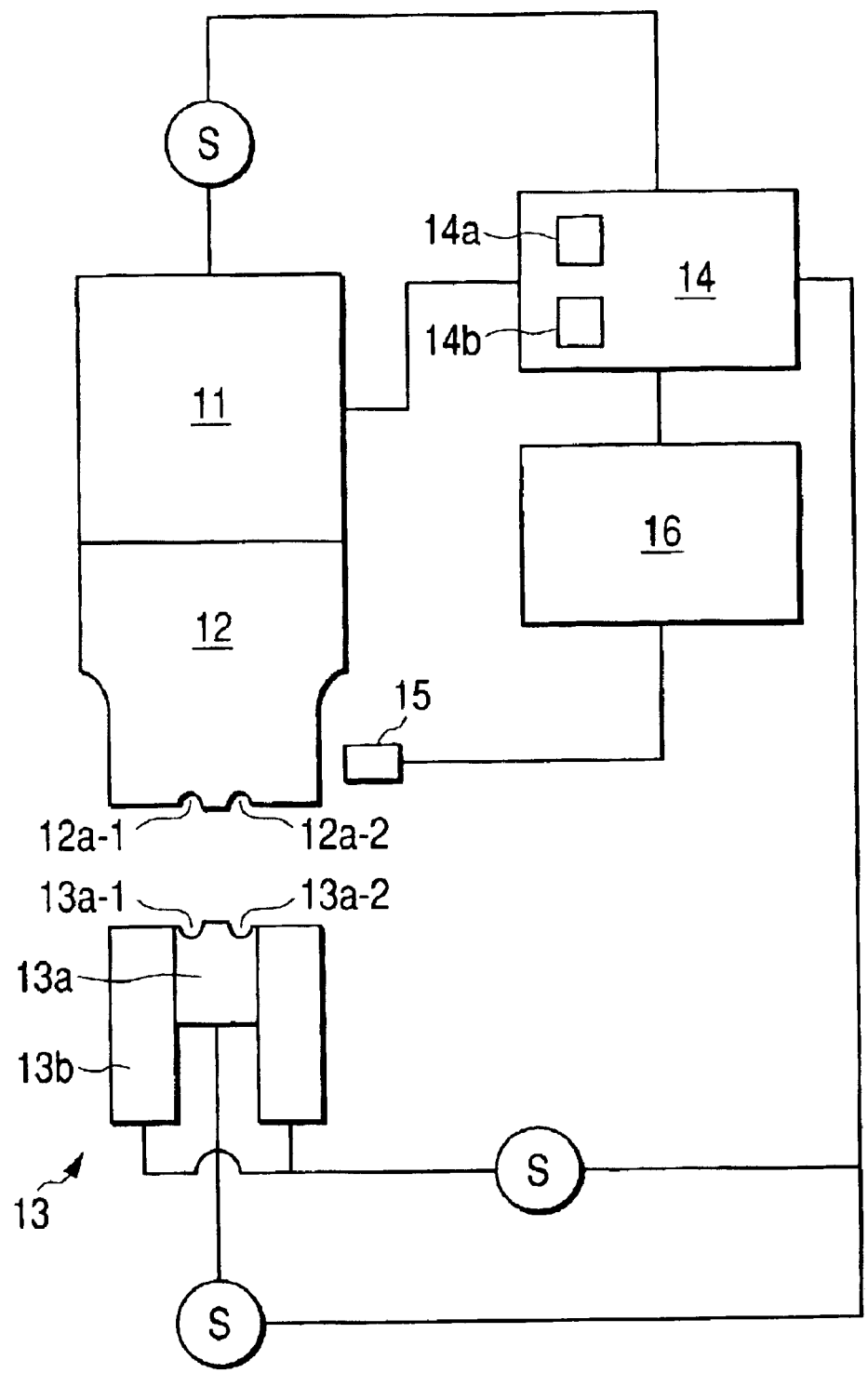
FIG. 3 is a view showing the schematic structure of an ultrasonic welding apparatus according to a first embodiment of the invention.

FIG. 3 shows the schematic structure of an ultrasonic welding apparatus according to a first embodiment of the invention as seen in the direction of the transfer of the slide fastener chain. As shown in FIG. 3, there are provided an ultrasonic vibrator 11, an ultrasonic horn 12 attached integrally to the ultrasonic vibrator 11, an anvil 13 provided opposite to the pressed surface of the ultrasonic horn 12, and a control portion 14 connected to each of the components. In the embodiment, furthermore, a temperature sensor 15 is additionally provided in the ultrasonic horn 12 and is connected to the control portion 14 through a temperature detector 16.

The anvil 13 according to the embodiment is divided into two parts including a first pressing anvil 13a (first anvil) of a core portion and a main tape portion provided adjacently to the core portion in a transverse direction orthogonal to the direction of the transfer of the slide fastener chain and a second pressing anvil 13b (second anvil) of the residual main tape portion. The opposed surfaces of the ultrasonic horn 12 and the first pressing anvil 13a are provided with two pairs of grooves 12a-1 and 12a-2 and 13a-1 and 13a-2 including upper and lower half parts having a core portion molding configuration obtained after welding a reinforcing tape piece in the space portion of the slide fastener chain, which is not shown, in parallel with the direction of the transfer of the fastener chain and being opposite to each other.

While the first pressing anvil 13a and the second pressing anvil 13b are individually moved separately in a vertical direction in the embodiment, the second pressing anvil 13b is moved synchronously. The ultrasonic horn 12 is also moved vertically from a standby position to a welding position. These movements are carried out in response to an instruction sent from a sequence control portion 14a of the control portion 14. The control portion 14 is further provided with a time setting portion 14b for setting a time required for welding to be carried out together with the first pressing anvil 13a and for setting a time required for welding to be carried out together with the second pressing anvil 13b. In the embodiment, the former welding time is set to be shorter than the latter welding time.

In the embodiment, the temperature sensor 15 is attached to the ultrasonic horn 12 as described above and a fluctuation in the temperature of the ultrasonic horn 12 is successively sent to the control portion 14 through the temperature detector 16 based on a temperature signal sent from the temperature sensor 15. Upon receipt of the fluctuation in the temperature of the ultrasonic horn 12, the control portion 14 calculates, by an operation, a welding time corresponding to the changed temperature and controls to change an initial time set to the time setting portion into the calculated time. In the embodiment, the ultrasonic horn 12 is constantly driven with a preset amplitude and a stroke for the movement of the ultrasonic horn 12 and the anvil 13 is always maintained to be constant such that pressing force to be applied to the core portion of the fastener tape and holding force to be applied to the main tape portion are not changed respectively.

Figure 4A:
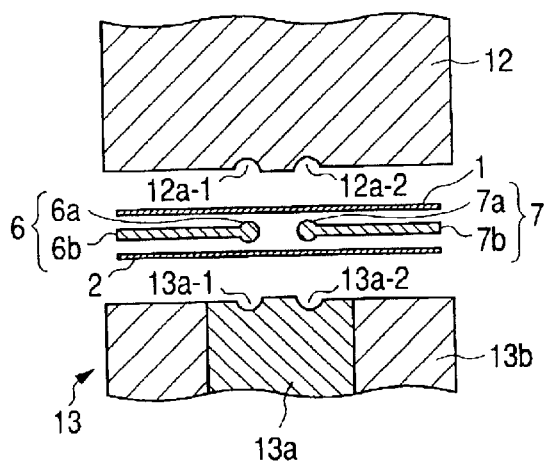
FIGS. 4A to 4D are views illustrating a welding procedure to be carried out by the ultrasonic welding apparatus according to the first embodiment.

A welding procedure according to the embodiment having the above structure will be described with reference to FIGS. 4A to 4D. First of all, when the space portion 5 to which the reinforcing tape pieces 1 and 2 in the slide fastener chain 3 are to be welded reaches a gap between the ultrasonic horn 12 and the anvil 13 which are placed apart from each other and stand by in the standby position, the transfer of the fastener chain 3 is stopped so that a pair of upper and lower reinforcing tape pieces 1 and 2 having predetermined lengths are transferred at the same time (FIG. 4A).

Figure 4B:
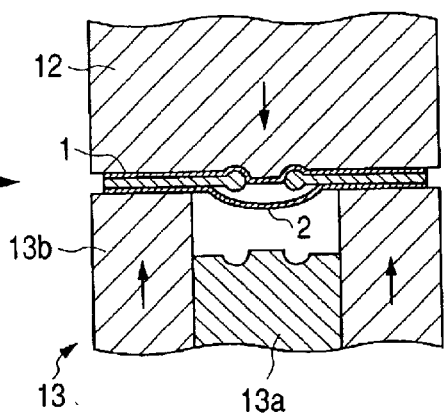

Then, the ultrasonic horn 12 is brought down to the welding position and a pair of second pressing anvils 13b are lifted to the welding position, and the reinforcing tape pieces 1 and 2 are held between the ultrasonic horn 12 and the second pressing anvil 13b in a hermetic contact state with main tape portions 6b and 7b in the space portion 5. After the operation is completed, the ultrasonic vibrator 11 is operated to vibrate the ultrasonic horn 12 and a synthetic resin layer having a low melting point on the welded surface side of the reinforcing tape pieces 1 and 2 is molten so that the reinforcing tape pieces 1 and 2 are fused and integrated with the main tape portions 6b and 7b (FIG. 4B).

Figure 4D:
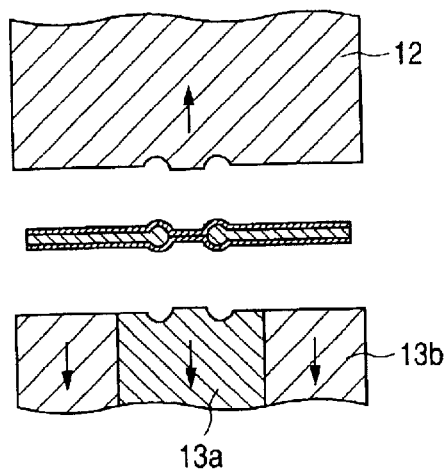
Figure 4C:
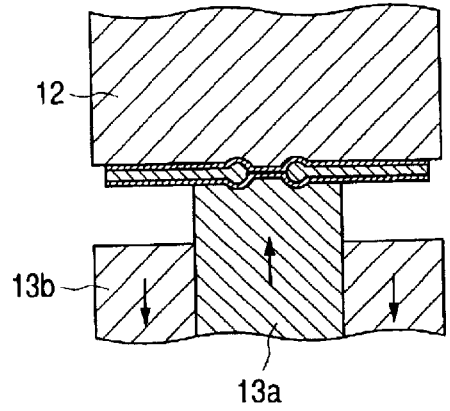

When a preset time passes in this state, the second pressing anvil 13b is brought down and the first pressing anvil 13a for pressing the reinforcing tape pieces 1 and 2, the core portions 6a and 7a and the main tape portions in the vicinity thereof are simultaneously lifted (FIG. 4C) At this time, the ultrasonic horn 12 is still vibrated continuously and the first pressing anvil 13a is lifted to the pressing position so that the reinforcing tape pieces 1 and 2, the core portions 6a and 7a and the main tape portion in the vicinity thereof are pressed by predetermined pressing force between the first pressing anvil 13a and the ultrasonic horn 12. Then the second pressing anvil 13 is brought down to the standby position placed below after the preset time passes. During the pressing, the synthetic resin layer having a low melting point on the welded surface side of the reinforcing tape pieces 1 and 2 to hermetically come in contact with the core portions 6a and 7a and the main tape portions in the vicinity thereof is molten so that the reinforcing tape pieces 1 and 2 are fused and integrated with the core portions 6a and 7a and the vicinity thereof and all the welding operations are completed (FIG. 4D).

The above operations are repeated so that the reinforcing tape pieces 1 and 2 are sequentially welded and integrated with a plurality of space portions 5 which are intermittently formed in the direction of the length of the long slide fastener chain 3. When such welding operations are repeated, the temperatures of the ultrasonic horn 12 and the anvil 13 themselves are raised with the passage of an operation time by the internal heat generation of the reinforcing tape pieces 1 and 2 and heat transfer caused by the heat generation. In the case in which the preset welding time is maintained as described above, particularly, both the core portions 6a and 7a and the main tape portions 6b and 7b are brought into an overheat state by a rise in the temperature of the ultrasonic horn 12 as long as other conditions are not changed. Consequently, the reinforcing tape pieces 1 and 2 are wholly fused and are caused to be fragile, and furthermore, the core portions 6a and 7a in the separable bottom stop attachment portion of the slide fastener chain 3 are caused to be rigid so that the cutting can easily be carried out in that portion.

In the embodiment, the ultrasonic horn 12 is additionally provided with the temperature sensor 15 to be connected to the control portion 14 through the temperature detector 16 as described above. When the welding operations are repeated so that the temperature of the ultrasonic horn 12 is raised, the temperature is detected by the temperature sensor 15 and a temperature signal thus detected is successively sent to the control portion 14 through the temperature detector 16. In the control portion 14, an optimum welding time is successively calculated in an operating portion in accordance with a temperature/time curve prestored in a storage portion based on the temperature signal sent from the temperature detector 16, and the welding time set at time of the start of working is reset to an optimum welding time calculated successively in the time setting portion 14b. Thus, the reinforcing tape pieces 1 and 2 can always be welded to the fastener tapes 6 and 7 in the space portion 5 in an optimum welding time. Therefore, it is possible to effectively prevent the welding portion from being fragile and rigid as described above.

In the first embodiment, other conditions or parameters for the welding of the reinforcing tape pieces 1 and 2 to the core portions 6a and 7a and the main tape portions 6b and 7b are set to be constant and only the welding time in the welding conditions is preset with an increase or a reduction. It is also possible to fix the welding time and to set the amplitude of the ultrasonic horn 12 to be increased or decreased, thereby controlling the amplitude.

In the welding apparatus of the reinforcing tape piece having the structure described above, furthermore, it is also possible to change the sequence of the sequence control portion 14a in the control portion 14, for example, based on a difference between the welding time of the reinforcing tape pieces 1 and 2 to the core portions 6a and 7a and the main tape portions in the vicinity thereof and the welding time of the reinforcing tape pieces 1 and 2 to the main tape portions 6b and 7b, and to first move the first pressing anvil 13a from the standby position to the welding position in the middle of the welding of the reinforcing tape pieces 1 and 2 to the main tape portions 6b and 7b between the ultrasonic horn 12 and the second pressing anvil 13b, and to wholly weld and integrate the reinforcing tape pieces 1 and 2 to the core portions 6a and 7a and the main tape portions in the vicinity thereof together with the main tape portions 6b and 7b within a preset residual time.

Figure 5:
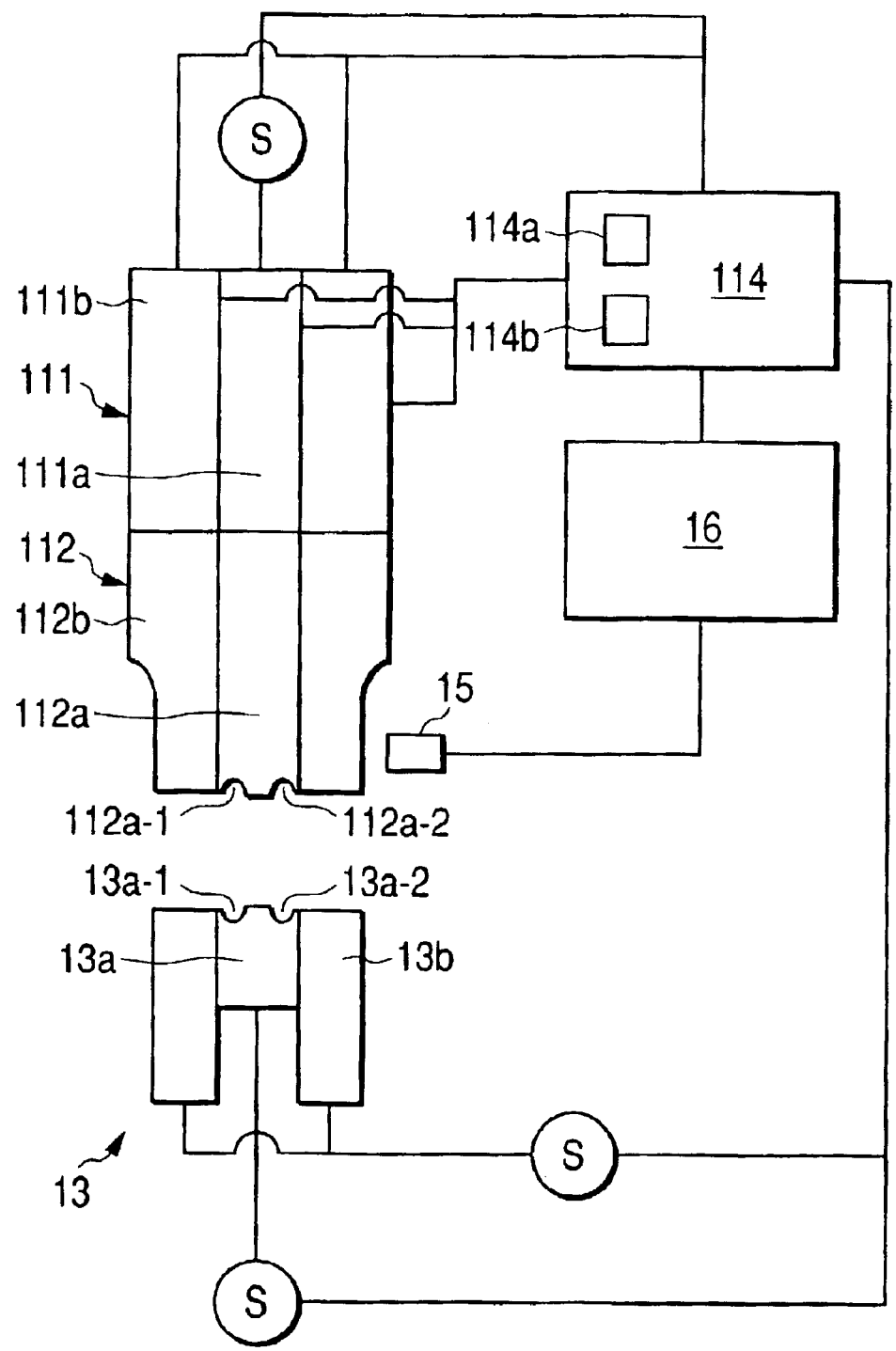
FIG. 5 is a view showing the schematic structure of an ultrasonic welding apparatus according to a second embodiment of the invention.

FIG. 5 shows the schematic structure of an ultrasonic welding apparatus according to a second embodiment of the invention as seen in the direction of transfer of a slide fastener chain. Also in the embodiment, there are provided an ultrasonic vibrator 111, an ultrasonic horn 112 attached integrally to the ultrasonic vibrator 111, an anvil 13 provided opposite to the pressed surface of the ultrasonic horn 112 and having the same structure as that of the first embodiment, and a control portion 114 connected to each of the components. In the embodiment, furthermore, a temperature sensor 15 is additionally provided in the ultrasonic horn 112 and is connected to the control portion 114 through a temperature detector 16 in the same manner as in the embodiment described above.

In the same manner as the anvil 13, the ultrasonic horn 112 according to the embodiment is divided into two parts including a first pressing horn 112a (first horn) for pressing a core portion and a main tape portion provided adjacently to the core portion, which are not shown, in a transverse direction orthogonal to the direction of the transfer of the slide fastener chain, which is not shown, (an orthogonal direction to a paper) and a second pressing horn 112b (second horn) for pressing the residual main tape portion. Special ultrasonic vibrators 111a and 111b are integrally attached to the pressing horns 112a and 112b, respectively. In the same manner as in the embodiment, the opposed surfaces of the first pressing horn 112a and a first pressing anvil 13a (first anvil) are provided with two pairs of grooves 112a-1 and 112a-2 and 13a-1 and 13a-2 including upper and lower half parts having a core portion molding configuration obtained after welding a reinforcing tape piece in the space portion of the slide fastener chain in parallel with the direction of the transfer of the fastener chain and being opposite to each other.

Also in the embodiment, the first pressing anvil 13a and a second pressing anvil 13b (second anvil) are individually moved independently in a vertical direction between a standby position and a welding position, and the first and second pressing horns 112a and 112b are also moved in the vertical direction between a standby position and a welding position according to the movement of the first and second pressing anvils 13a and 13b. These movements are carried out in response to an instruction sent from a sequence control portion 114a of the control portion 114. In the embodiment, the control portion 114 is further provided with an amplitude setting portion 114b for setting suitable amplitudes for the first pressing horn 112a and the second pressing horn 112b, respectively.

In the embodiment, the temperature sensor 15 is attached to the ultrasonic horn 112 as described above and a fluctuation in the temperature of the ultrasonic horn 112 is successively sent to the control portion 114 through the temperature detector based on a temperature signal sent from the temperature sensor 15. Upon receipt of the fluctuation in the temperature of the ultrasonic horn 112, the control portion 114 calculates, by an operation portion, an optimum amplitude corresponding to the changed temperature and controls to change an initial amplitude set to the amplitude setting portion 114b into the calculated amplitude. In the embodiment, the welding times of the first and second pressing horns 112a and 112b are set such that they are constantly driven in preset welding times respectively, and a stroke for moving the ultrasonic horn 112 and the anvil 13 is always maintained to be constant and pressing force to be applied to the core portion of the fastener tape and holding force to be applied to the main tape portion are not changed respectively.

Figure 6A:
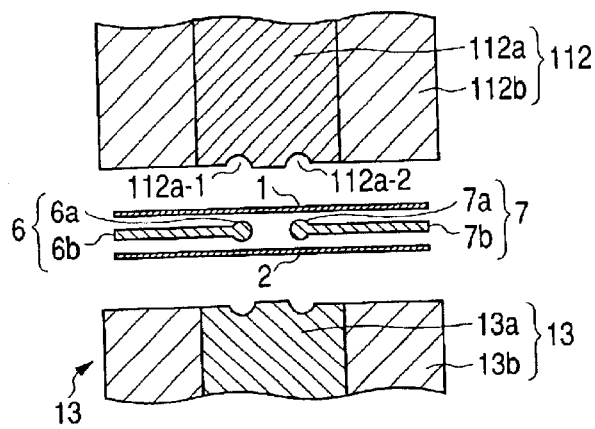
FIGS. 6A to 6D are views illustrating a welding procedure to be carried out by the ultrasonic welding apparatus according to the second embodiment.

A welding procedure according to the embodiment having the above structure will be described with reference to FIGS. 6A to 6D. First of all, when a space portion 5 of a slide fastener chain 3 to which reinforcing tape pieces 1 and 2 are to be welded reaches a gap between the ultrasonic horn 112 and the anvil 13 which are placed apart from each other and stand by in the standby position. The transfer of the fastener chain 3 is stopped so that a pair of upper and lower reinforcing tape pieces 1 and 2 having predetermined lengths are transferred at the same time with the fastener chain 3 interposed from above and below (FIG. 6A).

Figure 6B:
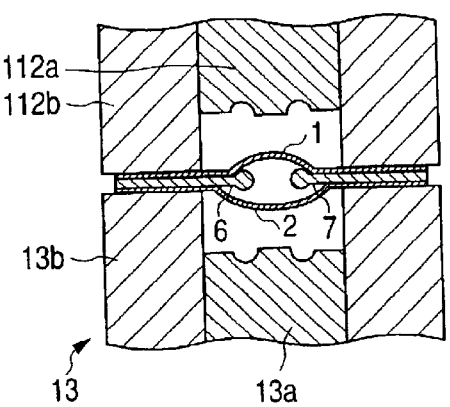

First of all, the second pressing horn 112b is brought down to the welding position and the second pressing anvil 13b is lifted to the welding position, and the reinforcing tape pieces 1 and 2 are held between the second pressing horn 112b and the second pressing anvil 13b in a hermetic contact state with main tape portions 6b and 7b in the space portion 5. Next, the second ultrasonic vibrator 111b is operated to vibrate the ultrasonic horn 112b for a predetermined time, and a synthetic resin layer having a low melting point on the welded surface side of the reinforcing tape pieces 1 and 2 is molten so that the reinforcing tape pieces 1 and 2 are fused and integrated with the main tape portions 6b and 7b, and subsequently, the vibration of the second pressing horn 112b is stopped (FIG. 6B).

Figure 6D:
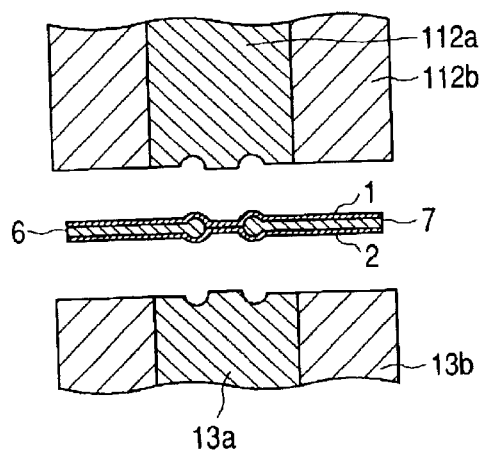
Figure 6C:
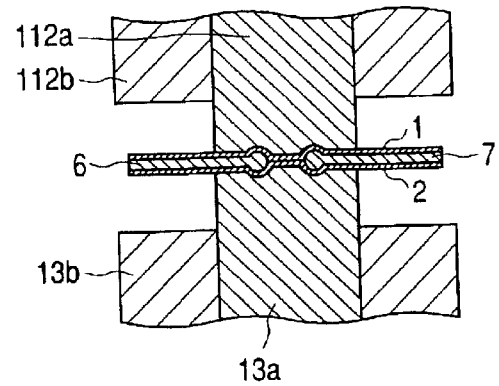

When the vibration of the second pressing horn 112b is stopped, the second pressing horn 112b and the second pressing anvil 13b are moved in such a direction as to separate from each other from the welding position to the standby position, and at the same time, the first pressing horn 112a and the first pressing anvil 13a which serve to press core portions 6a and 7a and the main tape portions in the vicinity thereof are moved in such a direction as to approach each other from the standby position to the welding position, thereby pressing and holding the core portions 6a and 7a and the main tape portions in the vicinity thereof through the reinforcing tape pieces 1 and 2 (FIG. 6C).

The first ultrasonic vibrator 111a starts an operation to vibrate the first pressing horn 112a with a preset amplitude and to melt a synthetic resin layer having a low melting point on the welded surface side of the reinforcing tape pieces 1 and 2 while pressing the core portions 6a and 7a and the main tape portions in the vicinity thereof by predetermined pressing force between the first pressing horn 112a and the first pressing anvil 13a, thereby welding the reinforcing tape pieces 1 and 2 to the core portions 6a and 7a and the main tape portions in the vicinity thereof and molding the sections of the core portions 6a and 7a to have necessary shapes at the same time. In the meantime, the second pressing horn 112b and the second pressing anvil 13b stand by in the standby position for a next welding operation.

When the operation for welding the reinforcing tape pieces 1 and 2 to the core portions 6a and 7a and the main tape portions in the vicinity thereof is ended, the actuation of the first ultrasonic vibrator 111a is stopped, and at the same time, the first pressing horn 112a and the first pressing anvil 13a are moved from the welding position to the standby position (FIG. 6D). Next, a transfer device which is not shown, for example, a feed roller is operated to transfer the slide fastener chain 3 until the next space portion 5 reaches the welding portions of the reinforcing tape pieces 1 and 2.

The above operations are repeated so that the reinforcing tape pieces 1 and 2 are sequentially welded and integrated with a plurality of space portions 5 which are intermittently formed in the direction of the length of the long slide fastener chain 3.

Also in the embodiment, when the welding operations are repeated so that the temperature of the ultrasonic horn 112 is raised, the temperature is detected by the temperature sensor 15 and a temperature signal thus detected is successively sent to the control portion 114 through the temperature detector 16. In the control portion 114, an optimum welding amplitude is successively calculated in an operating portion in accordance with a temperature/amplitude curve prestored in a storage portion based on the temperature signal sent from the temperature detector 16, and each of the amplitudes of the first and second pressing horns 112a and 112b which are set at time of the start of working is reset to an optimum amplitude calculated successively in the amplitude setting portion. Thus, the reinforcing tape pieces 1 and 2 can always be welded to the fastener tapes 6 and 7 in the space portion 5 with an optimum amplitude.

Also in the second embodiment, in the same manner as in the first embodiment, it is a matter of course that the welding time and other parameters for a welding condition can also be preset in place of the amplitude.

What is claimed is:

1. A welding method for welding a reinforcing tape piece made of a synthetic resin to a fastener tape of a slide fastener chain over a core portion and a main tape portion in the fastener tape by ultrasonic heating, comprising the steps of:
    setting a first welding condition including at least one of a welding time and an amplitude which is suitable for welding the reinforcing tape piece to the core portion and the vicinity of the core portion;
    setting a second welding condition including at least one of a welding time and an amplitude which is suitable for welding the reinforcing tape piece to the main tape portion;
    welding the reinforcing tape piece to the core portion and the vicinity of the core portion based on the first welding condition; and
    welding the reinforcing tape piece to the main tape portion based on the second welding condition,
    wherein the first welding condition is different from the second welding condition.

2. The welding method according to claim 1, wherein a parameter of the first welding condition is set to be smaller than a parameter of the second welding condition.

3. The welding method according to claim 1, wherein welding of the reinforcing tape piece to the core portion and the main tape portion in the vicinity of the core portion and welding of the reinforcing tape piece to the main tape portion except a portion in the vicinity of the core portion are carried out independently and separately.

4. The welding method according to claim 3, wherein the reinforcing tape piece is welded to the main tape portion except a portion in the vicinity of the core portion, and the reinforcing tape piece is successively welded to the core portion and the main tape portion in the vicinity of the core portion.

5. The welding method according to claim 4, wherein the reinforcing tape piece is welded to the core portion and the main tape portion in the vicinity of the core portion in the middle of welding the reinforcing tape piece to the main tape portion except the portion in the vicinity of the core portion.

6. The welding method according to claim 1, wherein the reinforcing tape piece is welded to a separable bottom stop attachment portion of the slide fastener chain.

7. A welding apparatus for welding a reinforcing tape piece made of a synthetic resin to a fastener tape of a slide fastener chain over a core portion and a main tape portion in the fastener tape by ultrasonic heating, comprising:
    an ultrasonic horn including a first outer configuration of the core portion and the main tape portion;
    an anvil including a second outer configuration of the core portion and the main tape portion;
    an ultrasonic vibrator connected to the ultrasonic horn; and
    a control portion connected to the ultrasonic vibrator and including a setting portion for setting a first welding condition having at least one of a welding time and an amplitude which is suitable for welding the reinforcing tape piece to the core portion and a vicinity of the core portion and for setting a second welding condition including at least one of a welding time and an amplitude which is suitable for welding the reinforcing tape piece to the main tape portion.

8. The welding apparatus according to claim 7, wherein the first welding condition includes only a welding time suitable for welding the reinforcing tape piece to the core portion and the vicinity of the core portion, and the second welding condition includes only a welding time suitable for welding the reinforcing tape piece to the main tape portion.

9. The welding apparatus according to claim 7, wherein the ultrasonic horn is formed by a single horn, and wherein the anvil includes:
- a first anvil which supports a pair of the core portions and the main tape portions in the vicinity of the core portions; and
- a pair of second anvils which supports the main tape portions except the vicinity of the core portions, and wherein the first anvil and the second anvils are operable independently each other.

10. The welding apparatus according to claim 9, wherein the control portion further includes a sequence control portion which controls:
- moving of the second anvils to a welding position to hold the reinforcing tape piece and the main tape portion together with the ultrasonic horn;
- operating of the ultrasonic vibrator under the second welding condition to heat and weld the reinforcing tape piece;
- moving of the second anvils to a standby position after heating and welding the reinforcing tape piece under the second welding condition;
- moving of the first anvil to a welding position to hold the reinforcing tape piece, the core portions and the main tape portions in the vicinity of the core portions together with the ultrasonic horn; and
- operating of the ultrasonic vibrator under the first welding condition to heat and weld the reinforcing tape piece; and
- moving of the first anvil to the standby position after heating and welding the reinforcing tape piece under the first welding condition.

11. The welding apparatus according to claim 9, wherein the control portion further includes a sequence control portion which controls:
- moving of the second anvils to a welding position to hold the reinforcing tape piece and the main tape portion together with the ultrasonic horn;
- operating of the ultrasonic vibrator under the second condition to heat and weld the reinforcing tape piece;
- moving of the first anvil to the welding position in the middle of heating and welding the reinforcing tape piece under the second condition;
- holding of the reinforcing tape piece, the core portions and the main tape portions in the vicinity of the core portions together with the main tape portion between the first anvil and the ultrasonic horn, thereby heating and welding the reinforcing tape piece in a residual operating time of the second condition; and
- moving of the first anvil and the second anvils to the standby position after the residual operating time passes.

12. The welding apparatus according to claim 7, wherein the first welding condition includes only an amplitude which is suitable for welding the reinforcing tape piece to the core portion and the vicinity of the core portion, and wherein the second welding condition includes only an amplitude which is suitable for welding the reinforcing tape piece to the main tape portion.

13. The welding apparatus according to claim 7, wherein the ultrasonic horn is formed by a single horn, and wherein the anvil includes:
- a first anvil which supports a pair of the core portions and the main tape portions in the vicinity of the core portions; and
- a pair of second anvils which supports the main tape portions, and wherein the first anvil and the second anvils are operable independently each other, and wherein the control portion further includes an operation indicating portion which operates the ultrasonic horn with the amplitude of the first welding condition for holding the reinforcing tape piece, the core portions and the main tape portion in the vicinity of the core portions by the ultrasonic horn and the first anvil, and operates the ultrasonic horn with the amplitude of the second welding condition for holding the reinforcing tape piece and the main tape portion between the ultrasonic horn and the second anvil.

14. The welding apparatus according to claim 7, wherein the ultrasonic horn includes:
- a first horn for exciting the core portions and the main tape portions in the vicinity of the core portions; and
- a second horn for exciting the main tape portion, and wherein the anvil includes:
- a first anvil opposite to the first horn; and
- a second anvil opposite to the second horn, and wherein the first horn, the second horn, the first anvil and the second anvil are operable independently each other, and wherein the control portion further includes an operation indicating portion which operates the ultrasonic horn with the amplitude of the first welding condition for holding the reinforcing tape piece, the core portions and the main tape portions in the vicinity of the core portions by the first horn and the first anvil, and operates the second horn with the amplitude of the second welding condition for holding the reinforcing tape piece and the main tape portion between the second horn and the second anvil.

15. The welding apparatus according to claim 7, wherein the reinforcing tape piece is welded to a separable bottom stop attachment portion of the slide fastener chain.

* * * * *